US009476392B2

(12) United States Patent
    Talaski

(10) Patent No.: US 9,476,392 B2
(45) Date of Patent: Oct. 25, 2016

(54) FUEL PUMP ASSEMBLY

(75) Inventor: Edward J. Talaski, Caro, MI (US)

(73) Assignee: TI Group Automotive Systems, LLC, Auburn Hills, MI (US)

( * ) Notice: Subject to any disclaimer, the term of this patent is extended or adjusted under 35 U.S.C. 154(b) by 201 days.

(21) Appl. No.: 13/360,294

(22) Filed: Jan. 27, 2012

(65) Prior Publication Data

US 2012/0201702 A1    Aug. 9, 2012

Related U.S. Application Data

(60) Provisional application No. 61/439,818, filed on Feb. 4, 2011.

(51) Int. Cl.
    *H02K 5/14*    (2006.01)
    *H02K 5/132*    (2006.01)
    (Continued)

(52) U.S. Cl.
    CPC .......... *F02M 37/048* (2013.01); *H01R 39/385* (2013.01); *H02K 5/148* (2013.01);
    (Continued)

(58) Field of Classification Search
    CPC ........ H02K 5/148; H02K 5/14; H02K 5/141; H02K 5/143; H02K 5/145; H02K 5/146; H02K 11/02; H02K 11/022; H02K 11/024; H02K 11/026; H01R 39/38; H01R 39/381; H01R 39/383; H01R 39/385; H01R 39/386; H01R 39/388; H01R 39/39; H01R 39/40; H01R 39/41; H01R 39/415; H01R 39/42; H01R 39/44; H01R 39/46
    USPC ..... 310/89, 239, 85, 87, 88, 68 C, 240, 241, 310/242, 243, 244, 245, 246, 247; 417/423.7, 410.1, 423.3, 423.14, 423.1
    See application file for complete search history.

(56) References Cited

U.S. PATENT DOCUMENTS 2,803,384 A * 8/1957 Korte et al. .................. 222/333
4,506,562 A * 3/1985 Yamaura et al. ........... 74/606 R
(Continued)

FOREIGN PATENT DOCUMENTS

| CN | 1854496 | 11/2006 |
|---|---|---|
| CN | 101178043 | 5/2008 |
| EP | 0312398 A | 4/1989 |

OTHER PUBLICATIONS

Shigley and Mischke, Mechanical Engineering Design, sixth ed. (McGraw-Hill 2001) pp. 103-104, 135-137, 256-257.*

(Continued)

*Primary Examiner* — Thomas Truong
*Assistant Examiner* — Robert E Mates
(74) *Attorney, Agent, or Firm* — Brinks Gilson & Lione

(57) ABSTRACT

A fluid pump includes an electric motor having a commutator and one or more brushes communicated with the commutator, and a pumping assembly driven by the electric motor. An outer shell of the pump encloses at least a portion of the electric motor and the pumping assembly, a cap is carried by the outer shell and has a brush passage formed therein for each brush, with each brush passage including a cavity defined by at least one wall. A brush cap has an end received in the cavity with an interference fit wherein the end of the brush cap has an outer diameter that is larger than the diameter of the cavity and the end of the brush cap has strength that causes it to deform upon installation into the cavity without causing significant plastic deformation of the wall of the cavity.

16 Claims, 3 Drawing Sheets

(51) Int. Cl.
*F04D 13/08* (2006.01)
*F02M 37/04* (2006.01)
*H01R 39/38* (2006.01)
*H02K 11/02* (2016.01)
*H02K 11/00* (2016.01)
*H01R 39/36* (2006.01)
*H02K 5/12* (2006.01)

(52) U.S. Cl.
CPC ........... *H02K 11/022* (2013.01); *H02K 11/40* (2016.01); *F04D 13/08* (2013.01); *H01R 39/36* (2013.01); *H02K 5/12* (2013.01); *H02K 5/132* (2013.01); *H02K 11/0089* (2013.01)

(56) References Cited

U.S. PATENT DOCUMENTS

| | | | |
|---|---|---|---|
| 4,719,074 A * | 1/1988 | Tsuno et al. | 419/5 |
| 4,798,984 A | 1/1989 | Suzuki et al. | |
| 4,918,802 A * | 4/1990 | Schaefer | H02K 1/278 29/598 |
| 5,013,222 A * | 5/1991 | Sokol et al. | 417/366 |
| 5,253,961 A * | 10/1993 | Geissler | 408/58 |
| 5,697,769 A * | 12/1997 | Kobman et al. | 417/410.1 |
| 5,722,700 A * | 3/1998 | Miyake et al. | 285/192 |
| 5,734,212 A * | 3/1998 | Uffelman | 310/51 |
| 6,424,758 B1 * | 7/2002 | Cheng | 385/16 |
| 6,541,883 B2 * | 4/2003 | Uffelman | 310/71 |
| 7,353,807 B2 | 4/2008 | Paluszewski | |
| 7,874,818 B2 | 1/2011 | Gottschalk et al. | |
| 2004/0086403 A1 | 5/2004 | Dokas | |
| 2008/0107549 A1 | 5/2008 | Crary et al. | |
| 2008/0188100 A1 * | 8/2008 | Saitoh | 439/82 |
| 2008/0298985 A1 | 12/2008 | Gettel et al. | |
| 2009/0087324 A1 * | 4/2009 | Fischer | F02M 37/08 417/423.14 |
| 2009/0202368 A1 | 8/2009 | Ito | |
| 2009/0297364 A1 * | 12/2009 | Takagi et al. | 417/48 |
| 2009/0321383 A1 * | 12/2009 | Lane | 215/382 |

OTHER PUBLICATIONS

EP Extended Search Report, Jun. 13, 2013, 7 pages.
CN Office Action for CN Application No. 201210131196.9 dated May 5, 2015 (10 pages).

* cited by examiner

FUEL PUMP ASSEMBLY

REFERENCE TO COPENDING APPLICATIONS

This application claims the benefit of U.S. Provisional Patent Application Ser. No. 61/439,818 filed Feb. 4, 2011, which is incorporated herein by reference in its entirety.

TECHNICAL FIELD

The present disclosure relates generally to a fluid pump including an electric motor.

BACKGROUND

Electric motor driven pumps may be used to pump various liquids. In some automotive applications, electric motor driven pumps are used to pump fuel from a fuel tank and deliver fuel under pressure to an engine. In such applications, a radio frequency interference circuit may be used to suppress electrical interference the pump may cause in the vehicle. The radio frequency interference circuit may be housed in an assembly that is electrically communicated with the electrical circuit providing power to the fuel pump motor.

SUMMARY

A fluid pump includes an electric motor and a pumping assembly driven by the electric motor. The motor includes a commutator and one or more brushes communicated with the commutator. An outer shell of the pump encloses at least a portion of the electric motor and the pumping assembly, a cap is carried by the outer shell and has a brush passage formed therein for each brush, with each brush passage including a cavity defined by at least one wall. A brush cap has an end received in the cavity with an interference fit wherein the end of the brush cap has an outer diameter that is larger than the diameter of the cavity and the end of the brush cap has strength that causes it to deform upon installation into the cavity without causing significant plastic deformation of the wall of the cavity.

A fuel pump assembly includes an electric motor having a commutator and one or more brushes communicated with the commutator, and a pumping assembly driven by the electric motor. An outer shell encloses at least a portion of the electric motor and the pumping assembly, and a cap carried by the outer shell has a brush passage formed therein for each brush and at least one outwardly extending tab. A RFI body coupled to the cap has at least one finger with an opening adapted to receive a tab of the cap when the RFI body is assembled to the cap, whereby the tab overlies a portion of the finger in assembly to retain the RFI body to the cap in assembly.

In at least one form a fluid pump has an electric motor with a commutator and one or more brushes communicated with the commutator, and a pumping assembly driven by the electric motor. An outer shell encloses at least a portion of the electric motor and the pumping assembly, and a cap carried by the outer shell has a brush passage formed therein for each brush, each brush passage including a cavity defined by at least one wall, and an opening communicating with one of the cavities. A brush cap has an end received in the cavity, the brush cap receiving electric power and providing electric power to the brushes. And a ground strap extends into said opening to engage a brush cap received in the cavity associated with the opening and the ground strap extends to the outer shell to electrically interconnect the brush cap and the outer shell.

BRIEF DESCRIPTION OF THE DRAWINGS

The following detailed description of exemplary embodiments and best mode will be set forth with reference to the accompanying drawings, in which.

DETAILED DESCRIPTION OF PRESENTLY PREFERRED EMBODIMENTS

Figures 1, 2, 3:
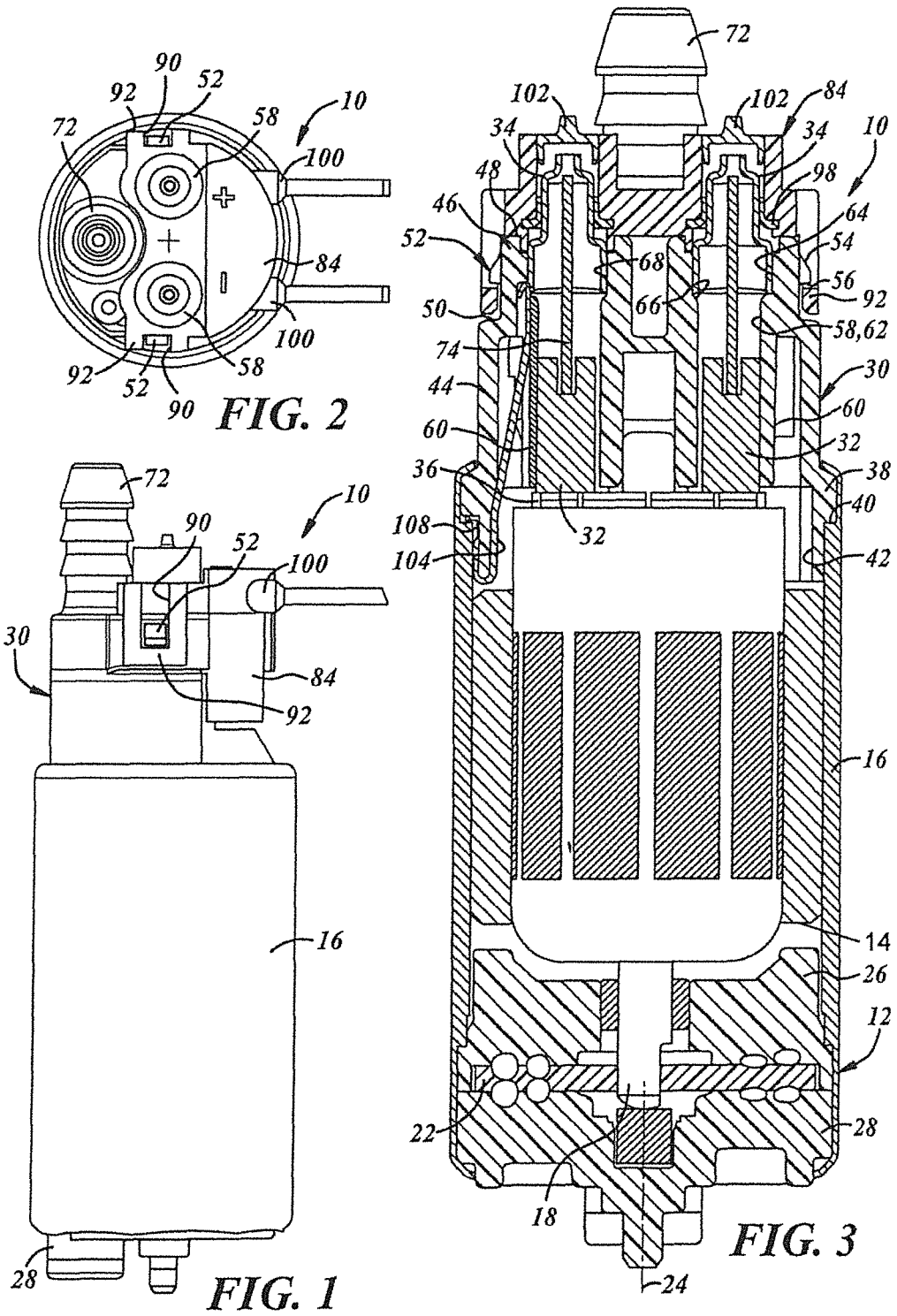
FIG. 1 is a side view of an exemplary fluid pump.
FIG. 2 is a top view of the fluid pump of FIG. 1.
FIG. 3 is a sectional view of the fluid pump.

Referring in more detail to the drawings, FIGS. 1-3 illustrate a liquid pump 10 that has a turbine type or impeller pump assembly 12 (FIG. 3) that may be driven for rotation by an electric motor 14. Of course, any other type of pump assembly including, by way of a non-limiting example, a positive displacement pump assembly, may be used. The pump 10 can used to pump any suitable liquid including, and for purposes of the rest of this description, automotive fuels. In this example, the pump 10 may be utilized in an automotive fuel system to supply fuel under pressure to the vehicle's engine.

As shown in FIG. 3, the motor 14 and associated components may be of conventional construction and may be enclosed, at least in part, by an outer shell 16. The pump assembly 12 may also be enclosed, at least in part, by the shell 16 with an output shaft 18 of the motor 14 coupled to an impeller 22 to rotatably drive the impeller 22 about an axis 24 of rotation.

The shell 16 may be formed of any material suitable for use in the fluid being pumped. In an automotive fuel pump application, the shell 16 typically is formed of metal. At its lower end, the shell 16 may engage, and axially and radially retain, an upper pump body 26 and a lower pump body 28. With the impeller 22, the upper and lower pump bodies 26, 28 define a pumping assembly so that, when the impeller 22 is rotated by the motor, fluid flows into an inlet and is discharged from an outlet under pressure. In the example shown, the pressurized fuel discharged from the outlet flows around the motor and within the shell 16. At its axially upper end, the outer shell 16 is connected to a pump cap 30 that encloses and covers brushes 32, brush caps 34 and a commutator 36 against which the brushes bear.

The pump cap 30 may extend axially from the outer shell 16 and, as shown in FIG. 3, may include an outwardly extending ring or flange 38 about which the shell 16 may be bent, rolled or otherwise formed to securely retain the cap. To facilitate forming the shell 16 around the cap 30, the shell may have a reduced thickness in the area that is formed about the flange 38. The area of reduced thickness may also provide a radially extending shoulder 40 against which the flange 38 is seated to accurately and securely retain the axial position of the cap 30 relative to the outer shell 16. A lower end 42 of the cap 30 may extend axially below or beyond the flange 38 to provide a more stable connection between the cap 30 and shell 16.

From the flange 38, the cap 30 may have an annular, outer sidewall 44 that extends axially and is circumferentially continuous so that fuel does not flow outwardly therethrough. The cap 30 may include a reduced diameter upper portion 46 leading to an upper surface 48 of the cap. A radially inwardly extending shoulder 50 may be defined at the transition to the upper portion. One or more catches or tabs 52 may be provided extending generally radially outwardly from the upper end 46 of the cap 30. Each tab 52 may include a ramp surface 54 that is radially inclined so that the tab has its smallest radial dimension (and generally smoothly blends in with a sidewall of the upper portion) at its end closest to the upper surface 48 and extends furthest outwardly from the upper end 46 at its end furthest from the upper surface. So constructed, the tabs 52 define a radially extending stop surface 56 at their lower end. Preferably, a plurality of circumferentially spaced apart tabs 52 are provided on the cap 30, and the tabs may be axially aligned (that is, they may be disposed at the same height along the cap).

Figure 4:
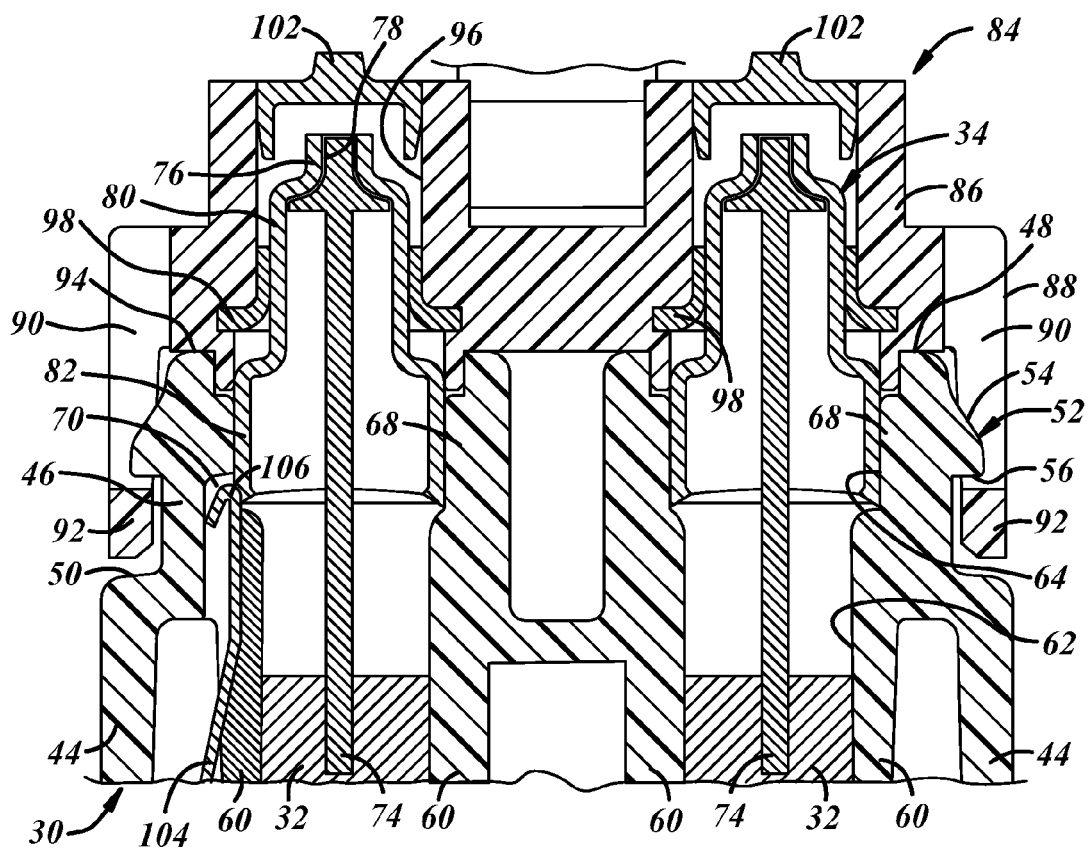
FIG. 4 is a partial sectional view of a radio frequency interference (RFI) body coupled to an upper cap of the fluid pump.
Figure 5:
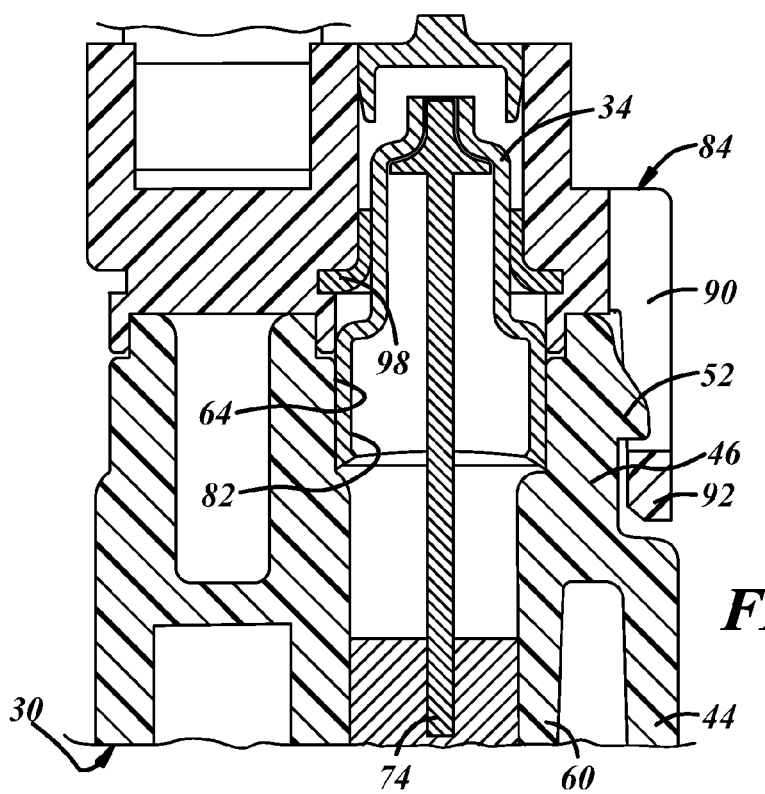
FIG. 5 is a fragmentary sectional view of a portion of the RFI body and upper cap, illustrating a brush cap.

One or more brush passages 58 may be formed in the cap 30. In the implementation shown, two brush passages 58 are formed in the cap 30 with each brush passage defined in part by an inner wall 60 which may generally cylindrical and annular. The brush passages 58 may be generally cylindrical and may have a main bore 62 and a cavity which may be in the form of a counterbore 64 near an upper end of the passages 58. The transition from the main bore 62 to the counterbore 64 may define a radially extending, annular shoulder 66 leading to an axially extending sidewall 68 of each counterbore 64. An opening 70 may be provided in communication with at least one counterbore 64, as best shown in FIG. 4. The cap 30 may entirely cover the upper end of the shell 16, and fuel exits from the pump 10 through a main fluid outlet passage 72 that may be defined by the cap. As shown in FIGS. 1 and 3, the outlet passage 72 may have a barbed periphery to facilitate retention of a fluid hose thereto. The cap 30 may be formed of any suitable material, including various polymers suitable for use with the fluid being pumped.

In assembly, the brushes 32 for the motor are disposed within the brush passages 58 and are urged into contact with the commutator 36. Shunt wires 74 extend generally axially from the brushes 32 and through the area of the counterbores 64. At their end opposite the brushes, each shunt wire 74 may be electrically coupled to a separate brush cap 34.

Each brush cap 34 may be formed of metal and may be soldered or otherwise connected to a respective one of the shunt wires 74. To facilitate connecting a shunt wire 74 to a brush cap 34, each brush cap may have a relatively narrow upper end 76 with an opening 78 in which the solder or other connector may be communicated with the shunt wire to couple it to the brush cap. The narrow upper end 76 may lead to an enlarged middle section 80 which may in turn lead to a further enlarged lower end 82 such that the brush caps 34 have a stepped sidewall. The lower end of each brush cap 34 may be sized for a desired fit and retention within a counterbore 64, as will be discussed in more detail herein. The bottom edge of the brush caps may engage the shoulder 66 when the brush caps are fully seated within their respective counterbores.

A second body 84 may be coupled to the cap 30 (where the cap may be considered to be a first body). The second body 84 may house a RFI circuit (not shown) which is electrically coupled to the brush caps 34 and other components of the electrical circuit of the motor, and may be referred to herein as a RFI body. The RFI body 84 may include a sidewall 86 and a plurality of fingers 88 each having an opening 90 spaced axially from a lower end 92 of the finger, as shown in FIGS. 1-5. One finger 88 may be provided for and aligned with each tab 52 on the cap 30. Preferably, the distance between the radially inner surfaces of the fingers 88 is less than the greatest distance between the outermost portions of the tabs 52. That is, to fit the RFI body 84 onto the cap 30, the fingers 88 must flex outwardly until the lower end 92 of the fingers has moved axially past the tabs 52 and the tabs are received within the openings 90 in the fingers. When this happens, the resiliency of the finger material causes the fingers 88 to return to their normally, unflexed state, and the lower end of each finger is axially below and radially overlapped by the stop surfaces 56 of the tabs 52. This prevents removal of the RFI body 84 from the cap 30 unless the fingers 88 are sufficiently pried outwardly to clear the tabs 52. In this way, the RFI body 84 is securely mechanically coupled to the cap 30 without need for welding, such as ultrasonic welding which has previously been used to couple plastic components like these. While shown and described with spaced apart, independent fingers, the RFI body could instead have a generally continuous sidewall or skirt with openings aligned with the tabs.

Also, the RFI body may include catches or tabs and the cap 30 may include voids in which the RFI body catches are received. That is, the location of the catches or tabs and the associated openings or voids could be reversed, or the RFI body and cap may each have a mix of catches or tabs and openings or voids. The catches and tabs can be considered to be mating mechanical connection features. In this way, the RFI body and cap may collectively include at least one mating pair or set (where a set is at least one catch and at least one void to receive the catch) of mechanical connection features that provide a snap-fit connection of the RFI body and cap.

The RFI body 84 may include a radially extending surface 94 that overlies and may rest on the upper surface 48 of the cap in assembly. In addition, the RFI body 84 may have a pair of brush cap passages 96 aligned in assembly with the brush passages 58 of the cap 30. A separate stamped metal ring 98 may be press-fit or otherwise disposed within each brush cap passage 96. Each ring 98 may be annular and have a radially outwardly extending flange press-fit or molded into the brush cap passage 96. The rings may also have an axially extending section with an inner diameter sized for an interference or press-fit over the middle section 80 (or other adjacent portion) of the brush cap 34. In the implementation shown, each brush cap 34 extends at least partially into a separate one of the brush cap passages 96 and is engaged with a ring 98. In this way, the rings 98 define part of the electrical flow path between the brushes 32 and the main terminals 100 (FIGS. 1 and 2) through which power is supplied to the electric motor. Covers 102 may be fitted into the upper end of the brush cap passages 96 to inhibit or prevent contaminants from entering the passages 58, 96.

As shown in FIGS. 1-3, the brush caps 34 may be generally thin-walled, hollow metal parts. The enlarged lower end 82 of each brush cap 34 may be generally annular, and may be press-fit or otherwise disposed within a counterbore 64 of the cap 30. In one implementation, the end 82 of the brush cap is pressed into the counterbore and is frictionally retained within the counterbore without need for an adhesive or other connector/connecting element. To help ensure the frictional retention of the brush cap within the cap 30, the outer diameter of the lower end of the brush cap is larger than the inner diameter of the counterbore. Accordingly, when the lower end of the brush cap is installed into its counterbore, one or both of the brush cap and the walls of the counterbore flex or are deformed to accommodate the larger diameter lower end of the brush cap. The strength of the walls 68 of the cap 30 in the area of the counterbores 64 is a function of the type of material from which the cap is made and the thickness of the walls. The strength of the lower end 82 of the brush cap 34 is a function of the material type and thickness.

The force required to insert the brush cap 34 into the counterbore 64 is a function of: 1) the strength of the walls 68 of the counterbore (a function of the stiffness and thickness of the walls); 2) the strength of the lower end 82 of the brush cap 34 (a function of the strength of the material and its thickness); and 3) the difference in size between the outer diameter of the brush cap and the diameter of the counterbore (where the larger the difference the higher the force will be required to install the brush cap). The installation force causes a compressive force on the lower end of the brush cap and an expansion force on the walls of the counterbore, tending to enlarge the counterbore. If too great a force is required to install the brush cap into the counterbore, the walls of the counterbore may unduly yield, plastically deform, or fracture. If too little a force is required to install the brush cap into the counterbore, there will be relatively little force tending to retain the brush cap within the counterbore.

For a given cap having counterbores of a given size that are defined by walls of a given thickness/strength, if the brush cap is made too strong such that its lower end unduly resists flexing or deformation when installed into the counterbore, or if the lower end of the brush cap is made too large relative to the counterbore, then the walls of the counterbore may undesirably plastically deform, crack or otherwise fail under the relatively high forces that will be needed to install the brush cap. Conversely, if the lower end of the brush cap is made too weak, or if the lower end of the brush cap is too small, then the brush cap can be too easily inserted into and removed from the counterbore and there will be comparatively little force retaining the brush cap in the counterbore. That is, the frictional retention may be insufficient to ensure continuous interconnection of the brush caps 34, shunt wire 74 and brushes 32 during the life of the fuel pump.

Accordingly, in at least one implementation, the lower end of the brush cap is designed to yield or plastically deform upon installation into the counterbore, and to do so under an installation force that is low enough to ensure that the walls of the counterbore do not fracture or substantially yield/plastically deform. That is, the difference in size between the outer diameter of the brush cap and the inner diameter of the counterbore, and the strength/resistance to deformation of the lower end of the brush cap are chosen so that the force required to install the brush cap into the counterbore is within the elastic limit of the walls of the counterbore and beyond the plastic limit of the brush cap. The resiliency of the material of the cap provides a reactive force acting inwardly on the brush cap and further retaining the brush cap within the counterbore. With a brush cap that conforms to the dimension of the counterbore by plastic deformation, the maximum force exerted on the counterbore walls can be limited and maintained less than the maximum force the wall 68 can endure before it yields or breaks, even with acceptable tolerances/variances of part dimensions taken into account.

Desirably, this permits use of relatively stiff plastic materials that do not elongate, stretch or compress easily and are prone to cracking or breaking when establishing an interference fit as described herein. This cracking or breaking tends to occur when the brush cap is installed into the plastic part. With these materials, the outer diameter of the installed brush cap can be more closely matched to the inner diameter of the counterbore because relatively little expansion of the counterbore is needed to provide a relatively strong reactive force acting on and retaining the brush cap. When less stiff/more ductile materials are used, the outer diameter of the brush cap must be comparatively larger than the counterbore to ensure sufficient force is required for installation and sufficient reactive force from the counterbore walls acts on the brush cap to retain it.

In one implementation, the outer diameter of the lower end 82 of the brush cap 34 may be between 2% and 5% larger than the inner diameter of the counterbore 64 or other void into which the lower end of the brush cap is received. When deformation of the brush cap takes place, the maximum interference that can be designed into this connection point can be greater than the elongation limit of the material of the plastic part 30. Additionally, the wall thickness of the plastic part must be sufficient to create enough stress in the installed brush cap to support resizing of the outer diameter such that the net size after installation is below the size that would create cracking or breaking of the plastic part. For example, with a plastic material having an elongation limit of 2%, the lower end 82 of the brush cap 34 can be more than 2% larger than the inner diameter of the counterbore 64 (or other void) without significantly plastically deforming the cap 30. This maintains an elastic deformation of the cap 30 and a resultant compressive force on the brush cap 34 to maintain the connection between the brush cap 34 and cap 30. In one form, the plastic may be an XTEL® plastic available from Chevron Phillips Chemical Company, and may be used in high temperature applications and be a stiff plastic having about a 2% elongation limit. The brush cap may be formed from brass and have a wall thickness of about 0.5 mm.

Figure 6:
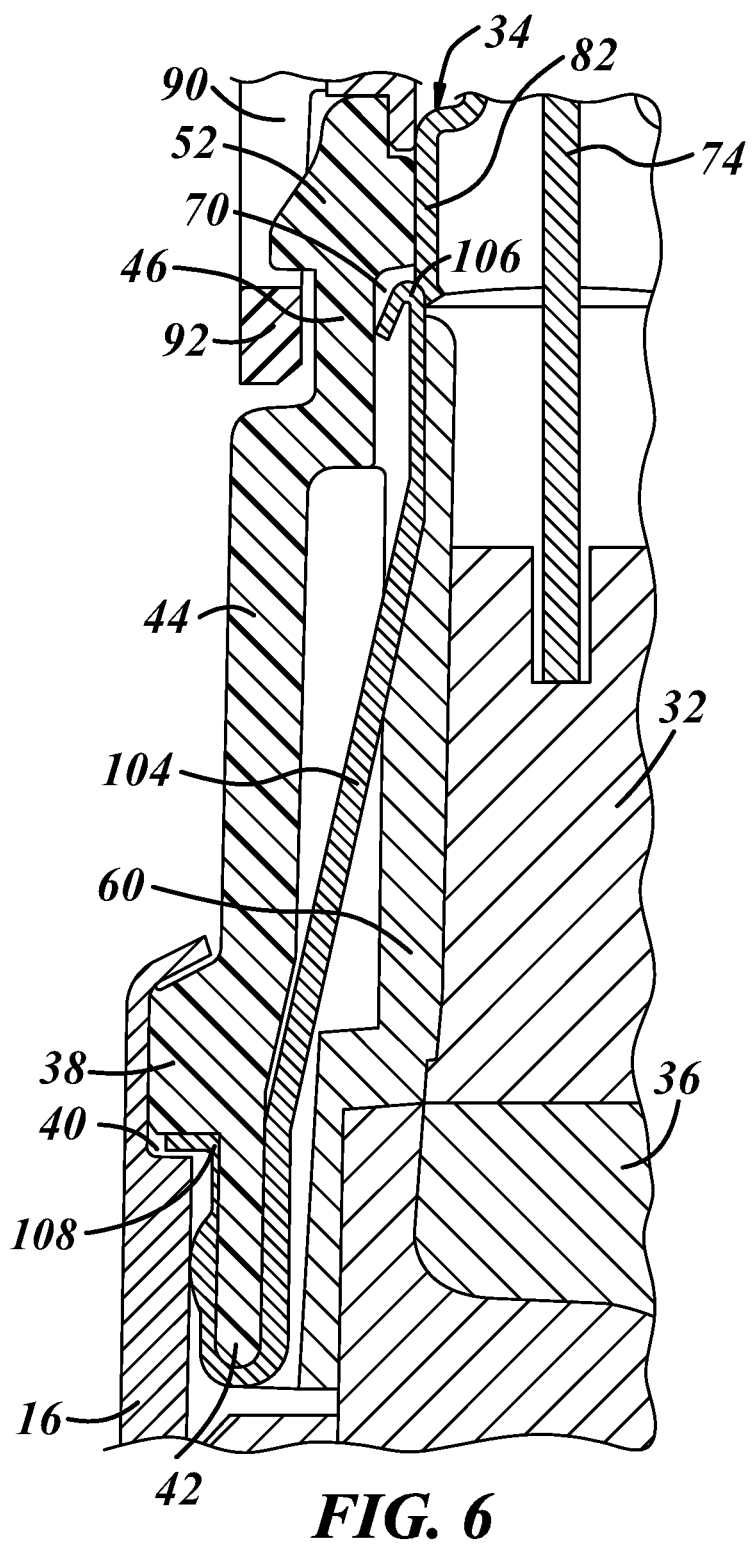
FIG. 6 is a fragmentary sectional view illustrating a portion of the upper body and a ground element interconnecting a brush cap with an outer shell of the fluid pump.

As shown in FIGS. 3, 4 and 6, a grounding element 104 may extend between a brush cap 36 and the outer shell 16, or other suitable electrical grounding component. The fluid pump 10 and/or its shell 16 may in turn be connected to ground through other components to which the pump is connected or in which the pump is received. Grounding the fluid pump 10 may be desirable in certain applications, such as when the pump is used to pump automotive fuel.

The grounding element may be a metal wire or strap 104. The strap 104 may be flexible and resilient, and can be formed to be routed or received around or between adjacent components in the fluid pump 10. In the implementation shown, a first end 106 of the strap 104 is received in the opening 70 formed in the cap 30 through the inner wall 60 that defines the adjacent brush passage 58. The first end 106 of the strap 104 may be bent or angled to frictionally engage the inside surface of the upper end 46 of the cap 30 and the inner wall 60. This helps retain the strap 104 on the cap 30 so that the strap does not separate from the cap during installation of the cap on the shell 16. The bent first end 106 also helps to ensure that the strap 104 extends into or through the opening 70 sufficiently to engage and bear on the adjacent brush cap 34. That is, the bent end 106 may provide a spring-like effect at the first end to bias a portion of the strap 104 away from the outer sidewall 44 and toward and into engagement with the brush cap 34. The strap 104 may extend between the outer sidewall 44 and the inner wall 60 (a slot may be formed in either or both walls, or a gap may be provided between them), and around the lower end 42 of the cap 30 where a second end 108 of the strap 104 engages the shell 16. In this way, the strap 104 electrically couples the brush cap 34 to the shell 16.

As noted, in the implementation shown, at least a portion of the strap 104 engages the outer shell 16. In this implementation, the strap 104 is bent around the lower end 42 of the cap 30 and extends along the outside surface of the lower end 42 and up to the flange 38. In assembly, as best shown in FIG. 6, a portion of the strap 104 at the second end 108 may extend and be trapped between the flange 38 and shoulder formed on the shell. In this way, engagement of the strap 104 and shell 16 can be assured and maintained throughout the service life of the pump 10. Of course, the strap 104 may also engage the shell 16 at a location spaced from the shoulder 40, such as in the area between the shell 16 and the lower end 42 of the cap 30, below the flange 38 (as viewed in the figures, of course, the pump could be oriented in a different direction).

The ground strap 104 may be a low cost, easy to form wire of any suitable shape and size. In one form, the strap is rectangular in cross-section. The strap 104 is easy to assembly and retains itself in position once assembled. The strap does not need to be molded into or as part of the cap 30. Instead, the strap may be preformed/bent prior to installation, and during installation can first be received around the lower end 42 of the cap 30 and then the first end 106 of the strap 104 can be simply inserted between the outer sidewall 44 and inner wall 60 and into the opening 70. The strap can retain this installed position without aid of other components, adhesives, etc. The strap 104 also does not have to be integrated into another portion of the circuit, such as the terminal assembly inside of the pump, or elsewhere. This facilitates manufacture of the other pump components and their assembly, compared to either insert molded straps or straps that are physically integrated into other portions of the circuit.

In addition to electrically connecting the brush cap 34 to the shell 16, the strap 104 may improve the net emitted RFI signature of the pump 10 which can reduce interference by the pump motor with other components. Further, the ground strap 104 decreases the net voltage potential of the shell 16, and avoids a static electric charge from accumulating on the shell or pump exterior. Finally, the grounding arrangement disclosed changes the polarity of the shell 16 to a negative polarity. With a negative polarity, it has been discovered that the shell 16 corrodes much less quickly than without a negative polarity, at least in certain fluids like automotive fuel (for example, unleaded fuel or ethanol based fuels).

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention. Relative terms, like "above", "below", "radial", "axial" and the like are used for illustrative purposes only and with reference to the orientation of the device as shown in the referenced drawings. The device could be used in other orientations, in which case, the relative terms may not be accurate, but other relative terms could be substituted to describe the other orientations.

The invention claimed is:

1. A fuel pump assembly, comprising:
an electric motor including a commutator and one or more brushes communicated with the commutator;
a pumping assembly driven by the electric motor;
an outer shell enclosing at least a portion of the electric motor and the pumping assembly;
a cap carried by the outer shell and having a brush passage formed therein for each brush, and at least one mechanical connection feature;
a radio frequency interference (RFI) body separate from and coupled to the cap and having at least one mechanical connection feature adapted to mate with the mechanical connection feature of the cap when the RFI body is assembled to the cap to retain the RFI body to the cap in assembly;
the mechanical connection feature of the cap includes at least one outwardly extending tab with a radially inclined surface, and the RFI body includes a finger in which an opening is provided, and the tab is adapted to cause the finger to be displaced radially outwardly as the RFI body is coupled to the cap until the opening passes said tab and the tab is received in the opening; and
the cap includes a brush cap that is electrically coupled to a brush and the RFI body includes a metal annular component that engages and surrounds at least a portion of the brush cap when the RFI body is coupled to the cap.

2. The fuel pump assembly of claim 1 which also includes a ground strap extending into an opening in the cap to engage the brush cap and extending to the outer shell to electrically interconnect the brush cap and the outer shell.

3. The fuel pump assembly of claim 1 which also includes a grounding strap engaged with both the outer shell and at least one of the metal annular component and the brush cap.

4. The fuel pump assembly of claim 1 wherein the cap is a plastic material having about a 2% elongation limit with a cylindrical bore of each brush passage defined by at least one wall of the plastic material having about a 2% elongation limit, and the brush cap is of metal having an annular end received and only frictionally retained in the cylindrical bore with an interference fit wherein the annular end of the brush cap before being received in the cylindrical bore has an outer diameter that is larger than the diameter of the cylindrical bore and the annular end of the brush cap has a strength that causes it to plastically deform upon installation into the cylindrical bore without significantly exceeding the yield strength of the wall of the cylindrical bore and with sufficient frictional engagement between them retaining the brush cap at a predetermined location in the cylindrical bore when the brush cap communicates with pressurized fuel discharged by the operating pump assembly.

5. The fuel pump assembly of claim 4 wherein the outer diameter of the end of the brush cap before being received in the cylindrical bore is at least 2% greater than the inner diameter of the cylindrical bore.

6. A fluid pump, comprising:
an electric motor including a commutator and one or more brushes communicated with the commutator;
a pumping assembly driven by the electric motor;
an outer shell enclosing at least a portion of the electric motor and the pumping assembly;
a cap carried by the outer shell and having a brush passage formed therein for each brush, each brush passage including a cavity defined by at least one wall, and an opening communicating with one of the cavities;
a brush cap having an end received in the cavity, the brush cap receiving electric power and providing electric power to the brushes;
a ground strap extending into said opening to engage a brush cap received in the cavity associated with the opening and extending to the outer shell to electrically interconnect the brush cap and the outer shell; and the ground strap engages the brush cap adjacent a first end of the ground strap which also engages the cap, and the first end is bent to bias a portion of the ground strap away from the cap and into engagement with the brush cap.

7. The fluid pump of claim 6 wherein the brush cap is formed of brass.

8. The fluid pump of claim 6 wherein the cap includes at least one mechanical connection feature, and wherein a radio frequency interference (RFI) body is coupled to the cap and has at least one mechanical connection feature adapted to mate with the connection feature of the cap when the RFI body is assembled to the cap to provide a snap-fit connection between the RFI body and the cap.

9. The fluid pump of claim 8 wherein the RFI body includes a metal component that engages the brush cap when the RFI body is coupled to the cap so that said metal component is electrically connected to the brush cap.

10. The fluid pump of claim 8 wherein the cap includes one or more tabs and the RFI body includes one or more openings, each opening aligned with a tab to receive a tab when the RFI body is coupled to the cap.

11. The fluid pump of claim 8 wherein said mechanical connection feature of the cap includes at least one outwardly extending tab with a radially inclined surface, and the RFI body includes a finger in which an opening is provided, and the tab is adapted to cause the finger to be displaced radially outwardly as the RFI body is coupled to the cap until the opening passes said tab and the tab is received in the opening.

12. The fluid pump of claim 6 wherein a portion of the ground strap is located between the cap and the outer shell.

13. The fluid pump of claim 6 wherein the ground strap extends around an end of the cap and a portion of the ground strap is located between the cap and the outer shell and engages the outer shell.

14. The fluid pump of claim 6 wherein the engagement of the ground strap with the brush cap and the outer shell causes the polarity of the outer shell to be negative.

15. The fluid pump of claim 6 wherein the cap is a plastic material having about a 2% elongation limit with a cylindrical bore of each brush passage defined by at least one wall of the plastic material having about a 2% elongation limit, and the brush cap is of metal having an annular end received and only frictionally retained in the cylindrical bore with an interference fit wherein the annular end of the brush cap before being received in the cylindrical bore has an outer diameter that is larger than the diameter of the cylindrical bore and the annular end of the brush cap has a strength that causes it to plastically deform upon installation into the cavity without significantly exceeding the yield strength of the wall of the cylindrical bore and with sufficient frictional engagement between them retaining the brush cap at a predetermined location in the cylindrical bore when the brush cap communicates with pressurized fuel discharged by the pumping assembly in operation.

16. The fluid pump of claim 15 wherein the outer diameter of the end of the brush cap before being received in the cavity is at least 2% greater than the inner diameter of the cylindrical bore.

* * * * *